United States Patent Office 3,520,932
Patented July 21, 1970

3,520,932
PREPARATION OF 5-AMINO-2,2-DIALKYLPENTANOLS
James C. Martin and Paul G. Gott, Kingsport, Tenn., assignors to Eastman Kodak Company, Rochester, N.Y., a corporation of New Jersey
No Drawing. Continuation-in-part of application Ser. No. 673,985, Oct. 9, 1967. This application Feb. 5, 1968, Ser. No. 702,792
Int. Cl. C07c *85/12*
U.S. Cl. 260—584      4 Claims

ABSTRACT OF THE DISCLOSURE

A process for preparation of 5-amino-2,2-dialkylpentanols by a one-step catalytic hydrogenation of 4-cyanodialkylbutyraldehydes in the presence of a rhodium catalyst and ammonia. Compounds produced by this process are useful as intermediates for the preparation of highly polymeric, linear poly(ester-amides) which are useful in the production of sheets, films, molded products and as hot melt adhesives.

---

This application is a continuation-in-part of our copending application Ser. No. 673,985, filed Oct. 9, 1967, now abandoned.

This invention relates to a process for the production of 5-amino-2,2-dialkylpentanols by a one-step catalytic hydrogenation of 4-cyanodialkylbutyraldehydes.

In our copending application Ser. No. 673,985, filed Oct. 9, 1967, now abandoned, we have described a two-step process for the preparation of 5-amino-2,2-dialkylpentanols from 4-cyanodialkylbutyraldehydes by selectively reducing the aldehyde group by means of hydrogen and copper chromite, then reducing the cyano group to the aminomethyl group by means of another catalyst. As stated in that application, the 5-amino-2,2-dialkylpentanols are novel compositions of matter useful as intermediates in the preparation of polyester-amides useful for the production of various commercial products such as films, sheets, molded products, and as hot melt adhesives. However, the process described in that application requires conversion of the starting material, namely, a 4-cyanodialkylbutyraldehyde, to the alcohol derivative and thereafter, by a separate step, hydrogenating the alcohol to the desired 5-amino-2,2-dialkylpentanol. The present invention is distinguished from our previous process by the discovery that by employing a specific catalyst and operating under the process conditions hereinafter described, the 5-amino-2,2-dialkylpentanol product may be obtained in a single step by the direct catalytic hydrogenation of a 4-cyanodialkylbutyraldehyde.

It is, accordingly, the principal object of the invention to provide a process of converting cyanoaldehydes directly to aminoalkanols in high yields by a one-step catalytic hydrogenation of the cyanoaldehyde.

Another object is to provide a process of converting 4-cyanodialkylbutyraldehydes to 5-amino-2,2-dialkylpentanols by direct catalytic hydrogenation of the aldehyde.

These and other objects will appear hereinafter.

These objects are accomplished by the following invention which, in its broader aspects, comprises the one-step catalytic hydrogenation of a 4-cyanodialkylbutyraldehyde, in the presence of a supported or unsupported rhodium catalyst, with or without a solvent, in the presence of ammonia, and at a temperature within the range of 20–200° C., at a pressure within the range of 50–5000 p.s.i.g., followed by removal of the solvent or other low boilers in vacuo. The 5-amino-2,2-dialkylpentanol product is then separated from the reaction mixture by distillation.

The solvent employed may be an alcohol such as methyl alcohol, ethyl alcohol, butyl alcohol, isopropyl alcohol or isobutyl alcohol, an ether such as diethyl ether, dibutyl ether, dioxane, tetrahydrofuran, dimethyl ether of ethylene glycol; or an aliphatic hydrocarbon such as hexane, cyclohexane or octane.

As to the catalyst, so far as we have been able to determine, rhodium is the only catalyst which is operative in our process. The catalyst may be supported or unsupported. Such catalysts are commercially available and generally consist of rhodium deposited on an inert carrier, such as alumina, carbon, barium carbonate, silica or similar supports. The catalyst may be employed as a powder when used in batch autoclave reductions or in a continuous slurry process. For a fixed-bed column reactor we prefer to use the catalyst in the form of pellets or granules.

We have found that the employment of ammonia in the process is critical to the success of the reaction. We have no explanation or theory to explain why ammonia is essential to the carrying out of the reaction but we have found that the reaction will not progress without the presence of ammonia in the reaction mixture. The amount of ammonia used may be varied but we prefer to use from 2 to 15 moles per mole of the 4-cyanodialkylbutyraldehyde employed as the starting material.

As indicated above, the reaction can be carried out at a temperature within the range of 20–200° C. The particular temperature employed will depend upon the particular cyanodialkylbutyraldehyde selected as the starting material as will be evident from the description which follows:

The particular 4-cyanodialkylbutyraldehydes employed as starting materials for the practice of the invention may be more specifically defined as 2,2-dialkyl-4-cyanobutyraldehydes. These compounds can be prepared by cyanoethylation of the corresponding aldehydes in accordance with the following equation.

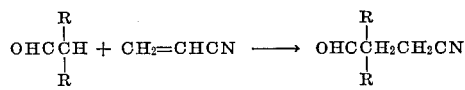

wherein R is an alkyl group of 1 to 8 carbon atoms. The general process for the preparation of these compounds is described by H. A. Bruson in "Organic Reactions," vol. V., Rogers Adams, editor, John Wiley and Sons, Inc., New York, 1949, pp. 79–135.

The reaction involved in the conversion of 4-cyanodialkylbutyraldehydes to 5-amino-2,2-dialkylpentanols in accordance with the invention is illustrated by the following equation:

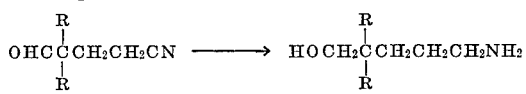

wherein R is an alkyl group containing from 1 to 8 carbon atoms. The two R's of the formula may be joined into a carbocyclic ring containing five or six members.

This invention will be further illustrated by the following examples of preferred embodiments, although it will be understood that these examples are included merely for purposes of illustration and are not intended to limit the scope of the invention.

EXAMPLE 1

5-amino-2,2-dimethylpentanol may be prepared by the following reaction:

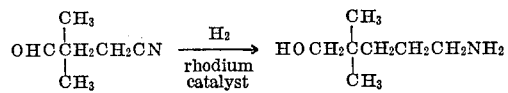

A mixture of 100 g. (0.8 mole) of 4-cyano-2,2-dimethylbutyraldehyde, 200 ml. of methanol, 5 g. of 5% rhodium on alumina powder, and 100 ml. of ammonia is hydrogenated in a stirred autoclave for 4 hrs. at 125° C. and a pressure of 1200 p.s.i. The autoclave is then discharged and the low boilers are removed in vacuo. Distillation of the residue through a 12-in. packed column gives 71 g. (68%) of 5-amino-2,2-dimethylpentanol, B.P. 70° C. (0.1 mm.).

*Analysis.*—Calcd. for $C_7H_{17}NO$ (percent): C, 64.1; H, 13.1; N, 10.7. Found (percent): C, 63.9; H, 12.8; N, 10.4.

EXAMPLE 2

Under the general conditions of Example 1, but using a temperature of 70°, there is obtained 44 g. (43%) of 5-amino-2,2-dimethylpentanol, B.P. 71–74° C. (0.2 mm.); 5 g. of an intermediate cut and 28 g. of 5,5′-iminobis(2,2-dimethylpentanol), B.P. 152° C. (0.3 mm.). This compound has the structure shown:

EXAMPLE 3

Under the general conditions of Example 1, but using a temperature of 23°, there is obtained 45 g. (45%) of 5-amino-2,2-dimethylpentanol; 7 g. of an intermediate cut and 33 g. of 5,5′-iminobis(2,2-dimethylpentanol).

Under the general conditions of Example 1, the following 4-cyanodialkylbutyraldehydes are hydrogenated to the corresponding 5-amino-2,2-dialkylpentanols:

230° C., and stirring is continued for 105 minutes. At the end of this time, most of the phenol liberated by reaction of the amino alcohol with the phenyl ester has distilled. The temperature of the heating bath is next raised to 260° C. and held for 20 minutes before applying reduced pressure. A blanket of nitrogen is kept over the reaction mixture at all times until vacuum is applied. The pressure is reduced to about 0.5 mm. Hg. Stirring is continued at 260° C. under vacuum for 17 minutes. The polymer attains a very high melt viscosity and winds up on the stirrer. The reaction flask is lifted out of the heating bath, and the polymer is allowed to cool under vacuum.

An inherent viscosity of the polymer, as measured in a 60:40 mixture of phenol:tetrachloroethane, is 1.39. The polymer cannot be made to crystallize either by solvent treatment or by heating. It softens and flows over the temperature range of 168° to 211° C. The glass transition temperature is 103° C. The polymer is readily soluble in chloroform containing a small amount of methanol. A clear film can be cast from the solution.

The polymer is injection molded at 227° C. to give a clear tough, hard plastic which remains clear after heat aging at 110° C. for three days. The 24-hour boiling water absorption is 3.8 percent. The stiffness, $2.5 \times 10^5$ p.s.i., of the molded polymer remains essentially unchanged after soaking in water at room temperature. The heat-distortion temperature at 264 p.s.i., loading is 100° C. The notched Izod impact strength is 0.73 ft. lb./in. of notch on test specimens ⅛-inch in thickness. The tensile yield strength is 7,700 p.s.i. and the elongation 123 percent. The Rockwell hardness is 88 on the L scale.

A polymer as described above, and others not specifi-

| Ex. | Starting Material | Temp., °C. | Solvent | Product | Analysis, Neutralization Equivalent | |
|---|---|---|---|---|---|---|
| | | | | | Theory | Found |
| 4 | $\begin{array}{c}C_2H_5\\|\\OHCCCH_2CH_2CN\\|\\CH_3\end{array}$ | 30 | Methanol | $\begin{array}{c}C_2H_5\\|\\HOCH_2CCH_2CH_2CH_2NH_2\\|\\CH_3\end{array}$ | 133.2 | 133.0 |
| 5 | $\begin{array}{c}C_3H_7\\|\\OHCCCH_2CH_2CN\\|\\CH_3\end{array}$ | 50 | None | $\begin{array}{c}C_3H_{17}\\|\\HOCH_2CCH_2CH_2CH_2NH_2\\|\\CH_3\end{array}$ | 147.3 | 146.9 |
| 6 | $\begin{array}{c}C_8H_{17}\\|\\OHCCCH_2CH_2CN\\|\\C_8H_{17}\end{array}$ | 120 | Dioxane | $\begin{array}{c}C_8H_{17}\\|\\HOCH_2CCH_2CH_2CH_2NH_2\\|\\C_8H_{17}\end{array}$ | 327.6 | 327.4 |
| 7 | cyclohexyl-CHO / CH₂CH₂CN | 180 | Tetrahydrofuran | cyclohexyl-CH₂OH / CH₂CH₂CH₂NH₂ | 171.3 | 171.7 |
| 8 | cyclobutyl-CHO / CH₂CH₂CN | 150 | Cyclohexane | cyclobutyl-CH₂OH / CH₂CH₂CH₂NH₂ | 157.3 | 157.4 |

The following example illustrates the utility of the 5-amino-2,2-dialkylpentanol products of the process of our invention in the production of useful plastic products such as sheets, films, molded products, adhesives and the like.

EXAMPLE 9

In a flask fitted with a stirrer, nitrogen inlet and outlet, distillation column, and take-off with provision for applying reduced pressure are placed 127.2 g. (0.4 mole) of diphenyl terephthalate; 52.4 g. (0.4 mole) of 5-amino-2,2-dimethylpentanol, and 0.16 g. of dibutyl tin oxide. The flask is evacuated and bled to nitrogen twice to remove occluded air. The flask and contents are then heated at 200° C. in a metal bath for 15 minutes. An atmosphere of nitrogen is maintained over the stirred reaction mixture. The reactants melt down to a clear homogeneous solution. The temperature of the heating bath is raised to cally illustrated but included in the scope of this invention, are especially useful in the production of molded objects, sheeting, film, and the like where clarity and reliability on aging under adverse conditions (such as heating and contact with organic compounds and water) are important. The polymers of this invention generally possess glass transition temperatures above 70° C. They have a well-balanced combination of physical properties for the above applications including good tensile strength, hardness, stiffness (wet and dry), elongation, and toughness. Not only do the polymers of this invention have these desirable properties immediately after processing, but they retain them throughout their long service life. Furthermore, the polymers of the instant invention are readily processable due to their amorphous nature, and have softening and melt flow temperatures below 250° C., and generally between 160° C. and 220° C. These polymers also show good adhesion to a variety of substrates, and, considering their ease of melting, can readily be applied as hot-melt adhesives.

Although the invention has been described in considerable detail with reference to certain preferred embodiments thereof, it will be understood that variations and modifications can be effected without departing from the spirit and scope of the invention.

We claim:

1. The process of preparing a 5-amino-2,2-dialkylpentanol having the formula

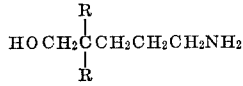

wherein each R, taken singly, is an alkyl group containing from 1 to 8 carbon atoms or both R's, taken collectively, represent a tetramethylene or pentamethylene group, which comprises the one-step catalytic hydrogenation of a 4-cyanodialkylbutyraldehyde having the formula

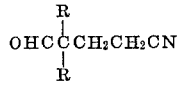

in the presence of a rhodium catalyst and ammonia, the mol ratio of 4-cyanodialkylbutraldehyde to ammonia being at least 1:2, at a temperature of 20 to 200° C. and at a pressure of 50 to 5000 p.s.i.g., and thereafter separating the 5-amino-2,2-dialkylpentanol product from the reaction mixture.

2. The process of claim 1 wherein the rhodium catalyst is rhodium on alumina and the mol ratio of 4-cyanodialkylbutyraldehyde to ammonia is 1:2 to 1:15.

3. The process of claim 2 wherein each R is methyl.

4. The process of claim 2 in which the hydrogenation reaction is carried out in the presence of a solvent and the 5-amino-2,2-dialkylpentanol product is separated from the reaction mixture by distillation.

References Cited

UNITED STATES PATENTS

| | | |
|---|---|---|
| 3,408,397 | 10/1968 | Feldman et al. |
| 3,061,644 | 10/1962 | Fierce et al. |
| 3,117,162 | 1/1964 | Rylander et al. |

FOREIGN PATENTS

| | | |
|---|---|---|
| 648,822 | 9/1962 | Canada. |

CHARLES B. PARKER, Primary Examiner

R. L. RAYMOND, Assistant Examiner

U.S. Cl. X.R.

260—583, 585

UNITED STATES PATENT OFFICE
CERTIFICATE OF CORRECTION

Patent No. 3,520,932      Dated July 21, 1970

Inventor(s) James C. Martin and Paul G. Gott

It is certified that error appears in the above-identified patent and that said Letters Patent are hereby corrected as shown below:

Column 2, lines 52-55, the formula should read as follows:

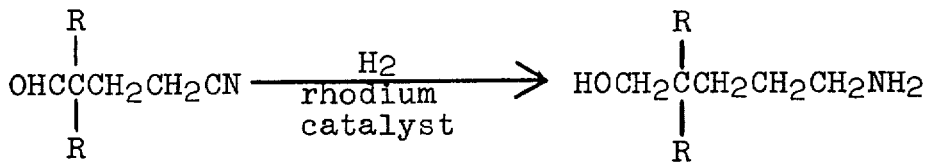

Column 2, line 56, delete "contaning" and insert in place thereof---containing---.

The table appearing in Columns 3 and 4, the formula for Example 5, appearing under the heading "Product" should read as follows:

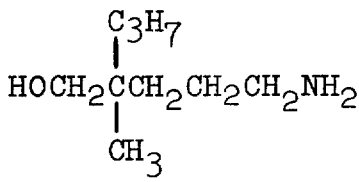

SIGNED AND SEALED
NOV 3 1970

(SEAL)
Attest:

Edward M. Fletcher, Jr.
Attesting Officer

WILLIAM E. SCHUYLER, JR.
Commissioner of Patents